(12) United States Patent
Kerr, III

(10) Patent No.: US 8,684,441 B2
(45) Date of Patent: Apr. 1, 2014

(54) VEHICLES INCORPORATING TAILGATE ENERGY MANAGEMENT SYSTEMS

(75) Inventor: Norman Charles Kerr, III, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 168 days.

(21) Appl. No.: 13/207,787

(22) Filed: Aug. 11, 2011

(65) Prior Publication Data

US 2013/0038081 A1 Feb. 14, 2013

(51) Int. Cl.
*B60P 1/26* (2006.01)
(52) U.S. Cl.
USPC ............................................. 296/50; 296/57.1
(58) Field of Classification Search
USPC ...................... 296/50, 57.1, 146.4, 146.8, 51
See application file for complete search history.

(56) References Cited

U.S. PATENT DOCUMENTS

| | | | |
|---|---|---|---|
| 4,702,511 A * | 10/1987 | Olins | 296/57.1 |
| 6,357,813 B1 | 3/2002 | Vandeberghe et al. | |
| 6,832,801 B2 | 12/2004 | Zagaroff | |
| 6,854,781 B2 | 2/2005 | Roach | |
| 6,857,679 B2 | 2/2005 | Zagaroff | |
| 6,994,390 B2 | 2/2006 | Zagaroff | |
| 7,063,373 B2 * | 6/2006 | Chikata et al. | 296/146.4 |
| 7,287,803 B2 * | 10/2007 | Koneval et al. | 296/146.4 |
| 7,314,241 B2 | 1/2008 | Roach | |
| 7,533,922 B1 | 5/2009 | Krajenke | |
| 7,654,600 B2 * | 2/2010 | Stratten | 296/50 |
| 7,850,219 B2 * | 12/2010 | Townson et al. | 296/50 |
| 2001/0033086 A1 * | 10/2001 | Yuge et al. | 296/56 |
| 2004/0026950 A1 | 2/2004 | Zagaroff | |
| 2006/0214453 A1 * | 9/2006 | Gerhardt | 296/57.1 |
| 2006/0249343 A1 * | 11/2006 | Prottengeier et al. | 188/381 |
| 2006/0261631 A1 * | 11/2006 | Watanabe et al. | 296/146.4 |
| 2007/0132264 A1 * | 6/2007 | Koneval et al. | 296/57.1 |
| 2008/0197651 A1 * | 8/2008 | Stratten | 296/50 |
| 2008/0211254 A1 * | 9/2008 | Maier et al. | 296/57.1 |
| 2009/0051192 A1 * | 2/2009 | Ewing et al. | 296/146.2 |
| 2009/0108613 A1 | 4/2009 | Krajenke | |
| 2009/0184533 A1 * | 7/2009 | Townson et al. | 296/57.1 |
| 2009/0222174 A1 * | 9/2009 | Frommer et al. | 701/49 |
| 2010/0084885 A1 * | 4/2010 | Townson et al. | 296/57.1 |
| 2010/0156139 A1 * | 6/2010 | Herrmann et al. | 296/146.4 |
| 2011/0089712 A1 * | 4/2011 | McIntyre et al. | 296/57.1 |
| 2012/0013143 A1 * | 1/2012 | Schiegel | 296/146.4 |
| 2013/0038081 A1 * | 2/2013 | Kerr, III | 296/57.1 |

\* cited by examiner

*Primary Examiner* — Glenn Dayoan
*Assistant Examiner* — Gregory Blankenship
(74) *Attorney, Agent, or Firm* — Dinsmore & Shohl LLP

(57) ABSTRACT

A vehicle includes sidewalls, a tailgate located proximate to rear ends of the sidewalls, and a tailgate energy management system. The tailgate energy management system includes a governor coupled to one of the sidewalls and to the tailgate. The governor selectively applies a governing force to the tailgate to reduce an opening speed of the tailgate. The tailgate energy management system also includes a speed sensor sensing an opening speed of the tailgate and an electronic control unit electronically coupled to the governor and the speed sensor. The electronic control unit includes a processor and memory storing an instruction set. The electronic control unit receives a speed signal indicative of the opening speed of the tailgate and the processor executes the instruction set to cause the electronic control unit to transmit a control signal to the governor to slow the opening speed of the tailgate based on the speed signal.

14 Claims, 7 Drawing Sheets

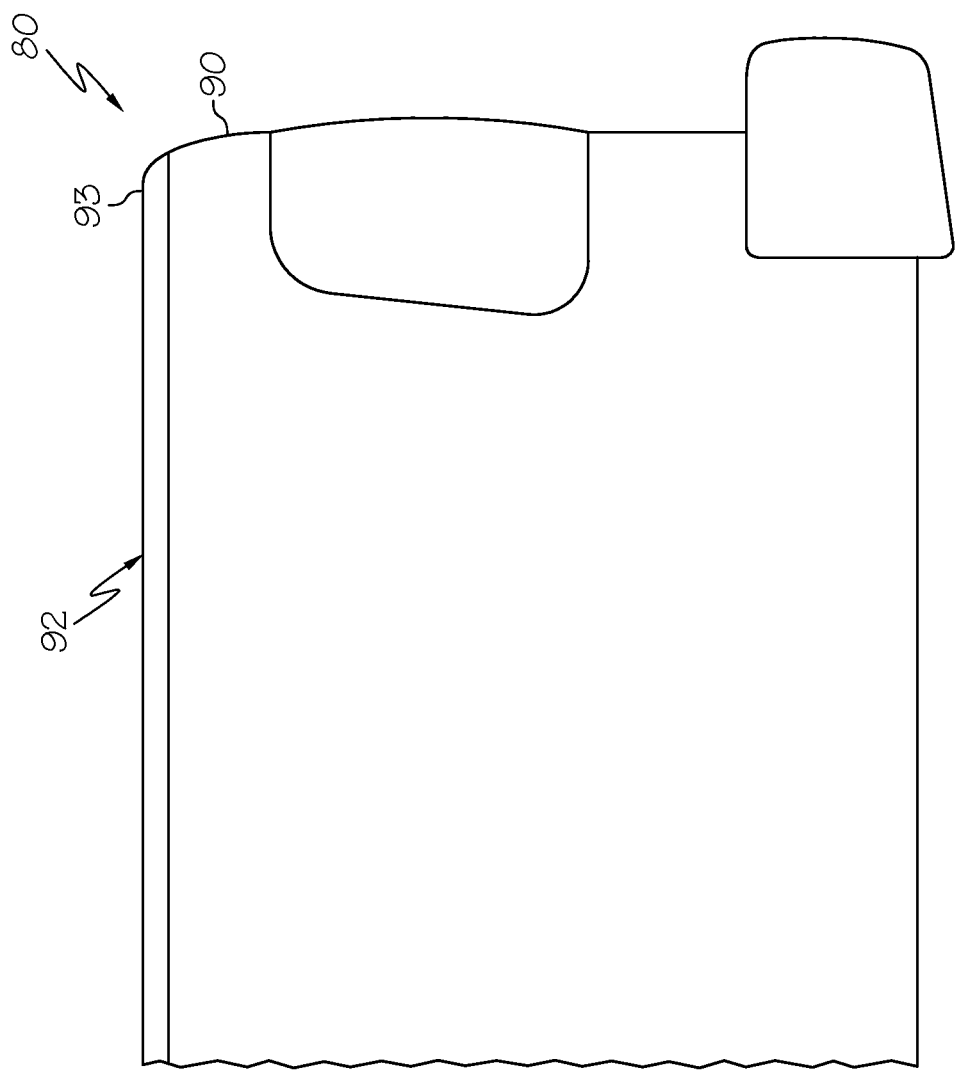

ly applies a governing force to the tailgate that reduce the opening speed of the tailgate. The tailgate energy management system also includes a speed sensor sensing an opening speed of the tailgate and an electronic control unit electronically coupled to the governor and the speed sensor. The electronic control unit includes a processor and memory storing a computer readable and executable instruction set. The electronic control unit receives a speed signal indicative of the opening speed of the tailgate from the speed sensor and the processor executes the instruction set to cause the electronic control unit to transmit a control signal to the governor such that the governor slows the opening speed of the tailgate based on the speed signal.

These and additional features provided by the embodiments described herein will be more fully understood in view of the following detailed description, in conjunction with the drawings.

VEHICLES INCORPORATING TAILGATE ENERGY MANAGEMENT SYSTEMS

TECHNICAL FIELD

The present disclosure is generally directed to tailgate energy management systems for vehicles and vehicles incorporating tailgate energy management systems that limit the opening speed of tailgates.

BACKGROUND

Vehicles having deployable tailgates, for example, pickup trucks, passenger vans, and sport utility vehicles (SUVs), may include lift assist devices that reduce the amount of force required to be applied by a user to control the motion of the tailgates as they are moved between open and closed positions. The lift assist devices may include gas dampers and/or torsion springs that apply a direction force to the tailgate that allows for easier opening and/or closing of the tailgate.

However, lift assist devices may not apply a force of variable intensity to accommodate a variety of conditions that the vehicle may be subject to. Using a pickup truck as an example, the opening speed (and therefore opening energy) of a tailgate may vary depending on vehicle inclination, ambient temperature, and/or gas damper wear. The variability in opening energy may be problematic in applications where the user chooses to open a tailgate while at a remote location, for example, when using a remote keyless entry system. In such an application, tailgates that contact surrounding objects while opening with energy greater than a predefined threshold energy may cause damage to the tailgate and/or the surrounding object.

Accordingly, vehicles incorporating tailgate energy management systems are desired.

SUMMARY

In one embodiment, a vehicle includes sidewalls spaced laterally apart from one another, a tailgate located proximate to rear ends of the sidewalls, and a governor coupled to one of the sidewalls and to the tailgate. The governor selectively applies a governing force to the tailgate to reduce an opening speed of the tailgate. The vehicle also includes a speed sensor sensing an opening speed of the tailgate and an electronic control unit electronically coupled to the governor and the speed sensor. The electronic control unit includes a processor and memory storing a computer readable and executable instruction set. The electronic control unit receives a speed signal indicative of the opening speed of the tailgate from the speed sensor and the processor executes the instruction set to cause the electronic control unit to transmit a control signal to the governor such that the governor slows the opening speed of the tailgate based on the speed signal.

In another embodiment, a vehicle includes sidewalls spaced laterally apart from one another, a tailgate located proximate to rear ends of the sidewalls, and a retractable cable assembly having a cable coupled to the tailgate and a rotatable drum about which the cable is wound. The vehicle also includes a governor coupled to the sidewalls and to the rotatable drum, where the governor selectively applies a governing force to the tailgate through the rotatable drum to slow an opening speed of the tailgate.

In yet another embodiment, a tailgate energy management system for controlling an opening speed of a tailgate relative to sidewalls of a vehicle includes a governor coupled to one of the sidewalls and to the tailgate, where the governor selec-

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 7 depicts a side view of a vehicle including a tailgate energy management system according to one or more embodiments shown and described herein.

DETAILED DESCRIPTION

Figure 1:
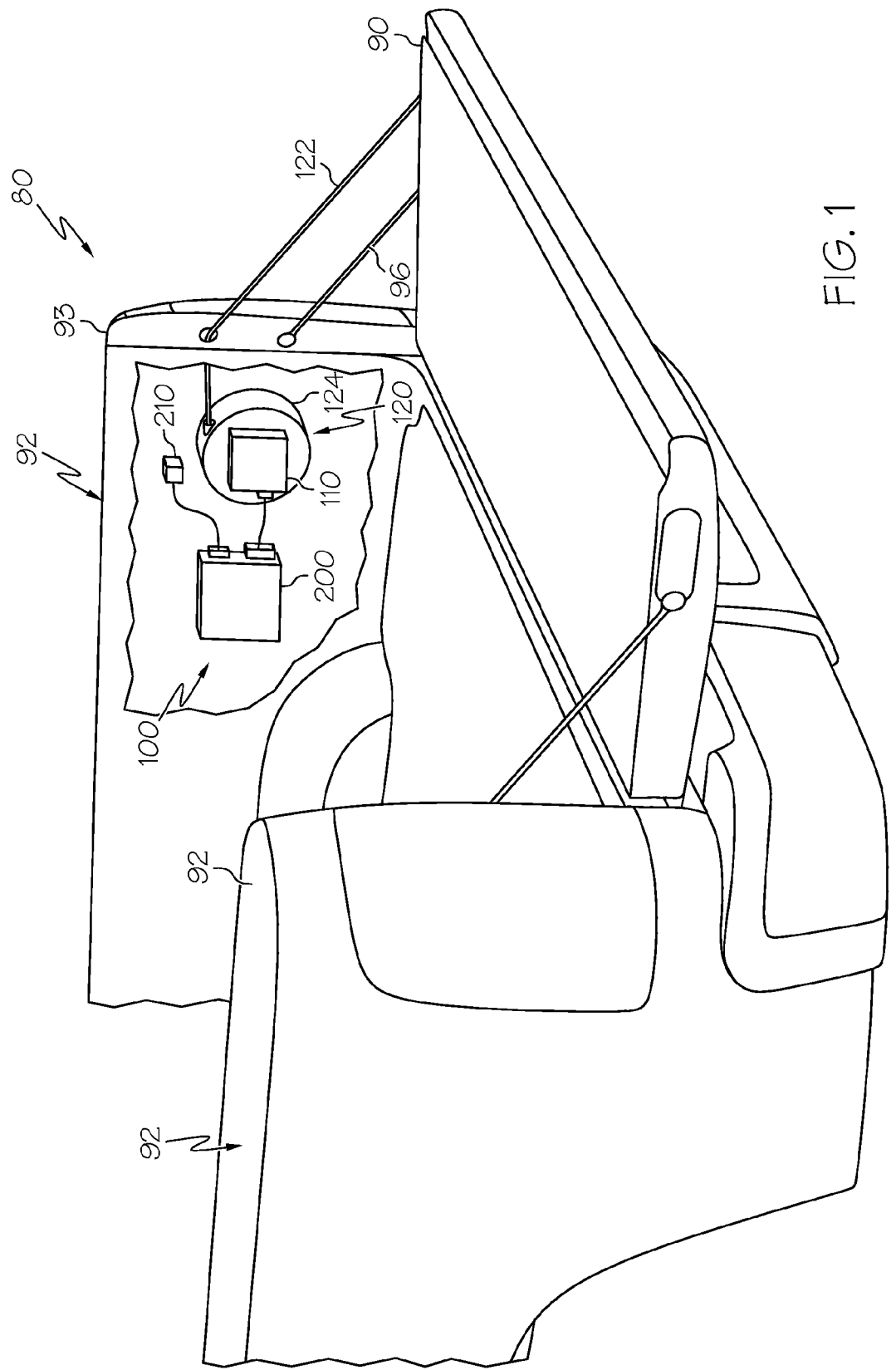
FIG. 1 depicts a perspective view of a vehicle including a tailgate energy management system according to one or more embodiments shown and described herein.

Embodiments described herein relate to vehicles having tailgate energy management systems that limit the opening energy of the tailgates. Referring to FIG. 1, one embodiment of a vehicle with a tailgate energy management system is schematically depicted. The vehicle includes a tailgate located proximate to the rear ends of the sidewalls of the vehicle. A governor is coupled to one of the sidewalls and to the tailgate. An electronic control unit works in conjunction with the governor to selectively apply a governing force to the tailgate. The governing force reduces the opening speed of the tailgate. The electronic control unit receives a speed signal from a speed sensor that indicates the opening speed of the tailgate. The electronic control unit transmits a control signal to the governor causing the governor to apply the governing force to the tailgate based on the speed signal. Embodiments of the tailgate energy management system and vehicles incorporating the same will be described in more detail herein.

Referring now to FIG. 1, one embodiment of a vehicle 80 including a tailgate energy management system 100 is shown.

The vehicle 80 includes two sidewalls 92 spaced laterally apart from one another. A tailgate 90, illustrated in an open position, is located proximate to the rear ends 93 of the sidewalls 92. The tailgate energy management system 100 includes a governor 110 coupled to one of the sidewalls 92 of the vehicle 80. The tailgate energy management system 100 also includes an electronic control unit 200 electronically coupled to the governor 110 and to a speed sensor 210. The speed sensor 210 transmits a speed signal that is received by the electronic control unit 200. The speed signal corresponds to the opening speed of the tailgate 90. The speed sensor 210 may be a Hall Effect sensor or a similar sensor for determining the rotational speed of a component. The speed sensor 210 may determine the rotational rate of the retractable cable assembly 120 or the linear speed of travel of the cable 122 coupled to the tailgate 90.

As used herein, governor 110 is a clutch assembly or a brake assembly that applies a force to a proximate component of the tailgate energy management system 100 to slow or stop the movement of the proximate component. In the embodiment described herein, the governor 110 is electronically actuated by a control signal transmitted from the electronic control unit 200 and received by the governor 110. When the governor 110 receives the control signal from the electronic control unit 200, the governor 110 applies a force to the proximate component of the tailgate energy management system 100 such that the force reduces the opening speed of the tailgate 90. An example of such an electronically actuated governor 110 is an electromagnetic clutch or electromagnetic brake available from Ogura Industrial Corp. of Somerset, N.J. In the alternative, the governor 110 may be mechanically controlled and actuated. Examples of such a mechanically controlled and actuated governor 110 may include a centrifugal clutch or brake that engages a proximate component of the tailgate energy management system 100 when the speed of rotation of the centrifugal clutch or brake exceeds a threshold speed.

In the embodiment depicted in FIG. 1, the tailgate energy management system 100 further includes a retractable cable assembly 120 that includes a cable 122 and a rotatable drum 124. The cable 122 is coupled to the tailgate 90 and is wound about the rotatable drum 124. The rotatable drum 124 pays out the cable 122 as the tailgate 90 rotates from a closed position (as depicted in FIG. 7) to an open position (as depicted in FIG. 1). Additionally, the rotatable drum 124 collects the cable 122 and winds the cable 122 about the rotatable drum 124 as the tailgate 90 rotates from an open position to a closed position.

The vehicle 80 may also include an over-travel cable 96 coupled to both the sidewall 92 and to the tailgate 90. The over-travel cable 96 supports the tailgate 90 when the tailgate 90 is in the open position and stops the tailgate 90 from rotating. As shown in FIG. 1, the over-travel cable 96 stops the tailgate 90 from rotating and holds the tailgate 90 in an approximately horizontal orientation.

Figure 2:
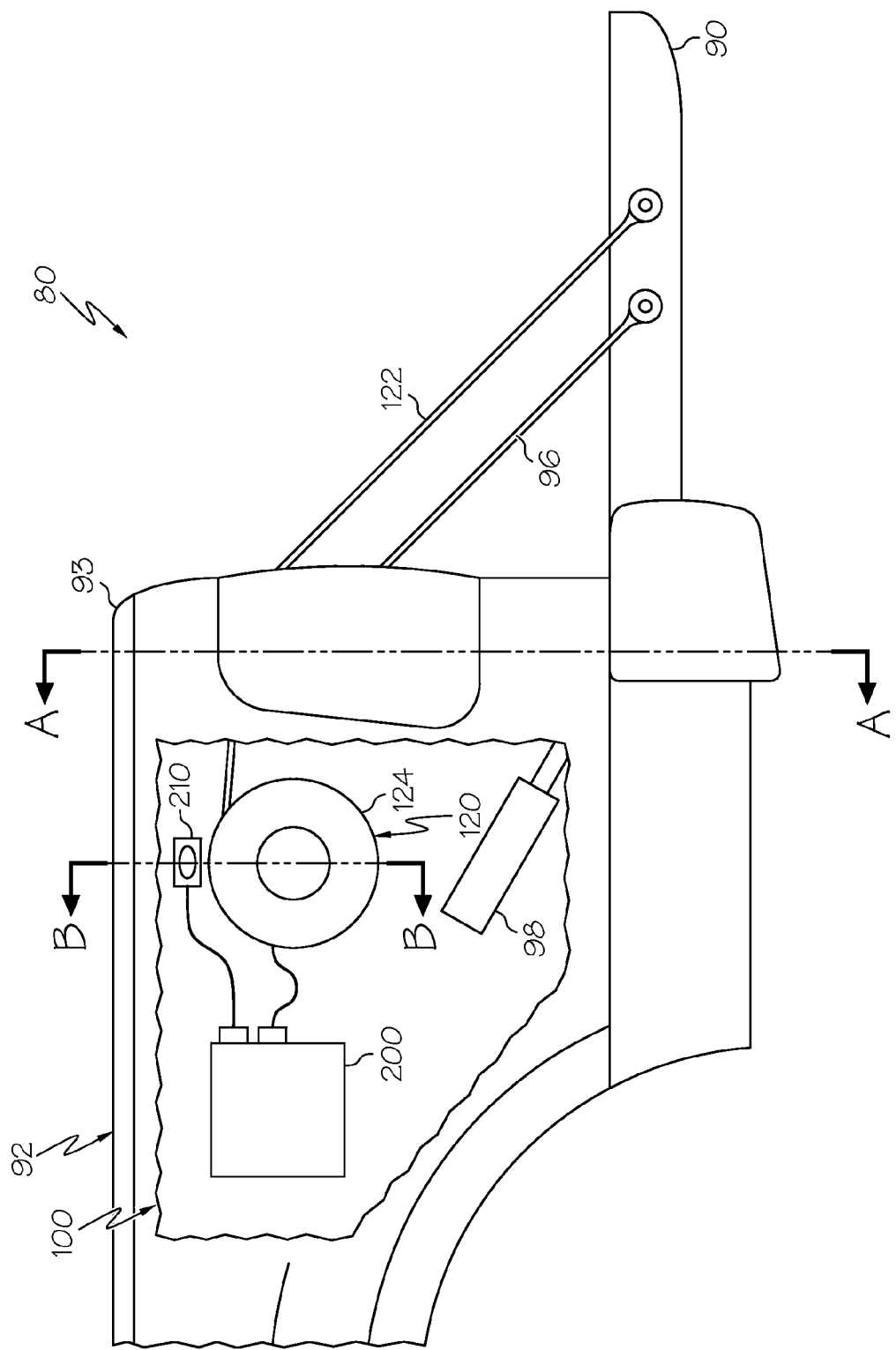
FIG. 2 depicts a cut-away side view of a vehicle including a tailgate energy management system according to one or more embodiments shown and described herein.

Referring to FIG. 2, one embodiment of the vehicle 80 may include a tailgate assist damper 98 coupled to a sidewall 92 of the vehicle 80 and to the tailgate 90. The tailgate assist damper 98 applies an assist force to the tailgate 90 in a direction that reduces the force required to be input by a user to reposition the tailgate 90 between open and closed positions. In the embodiment depicted in FIG. 2, the tailgate assist damper 98 applies a force to the tailgate 90 in a direction corresponding to rotating the tailgate 90 from an open position to a closed position. Thus, the tailgate assist damper 98 shown in FIG. 2 reduces the opening speed of the tailgate 90 and/or reduces the force required to be applied by a user to rotate the tailgate 90 to the closed position. An example of such a tailgate assist damper 98 includes the Tailgate Lift-Assist available from Multimatic Inc. of Markham, Ontario, Canada.

Figure 3:
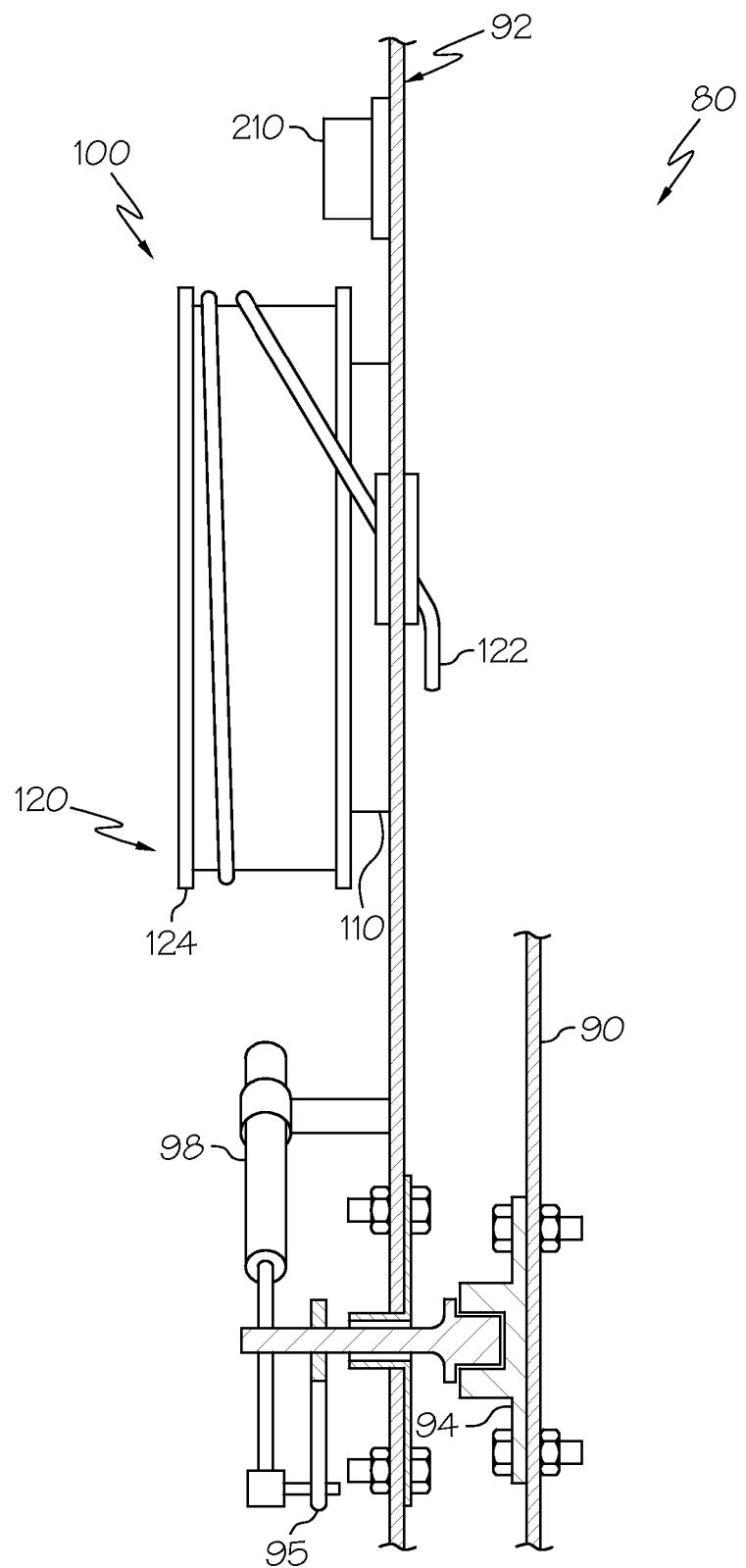
FIG. 3 depicts a rear view of the vehicle including a tailgate energy management system of FIG. 2 along line A-A.
Figure 4:
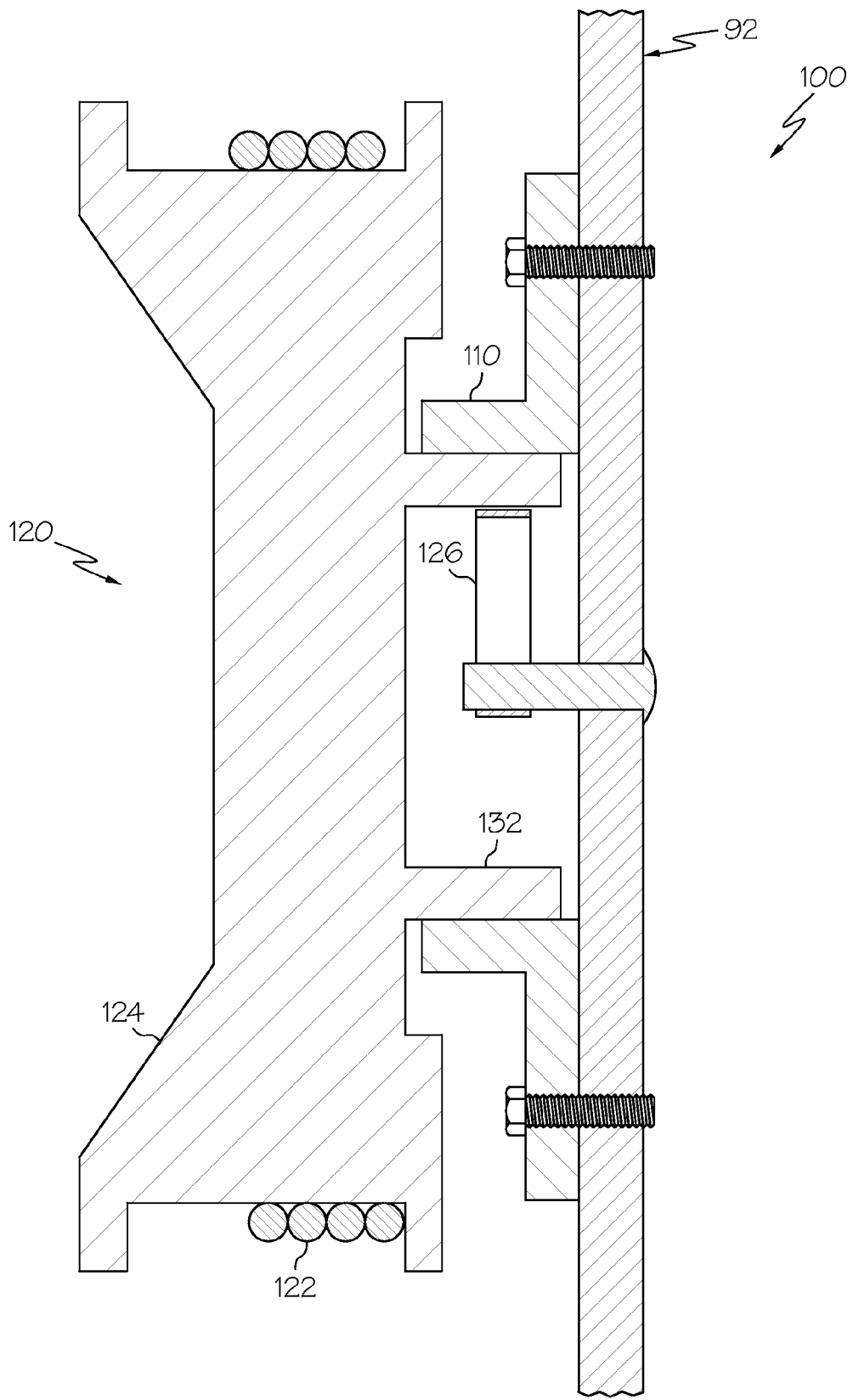
FIG. 4 depicts a rear view of the tailgate energy management system of FIG. 2 along line B-B.

Referring now to FIG. 3, components of the tailgate energy management system 100 of FIG. 2 are shown in greater detail. The tailgate assist damper 98 is coupled to the tailgate 90 through a linkage 95 that connects to a hinge 94. The linkage 95 and the hinge 94 transmit torque from the tailgate assist damper 98 to the tailgate 90. The rotatable drum 124 of the retractable cable assembly 120 is coupled to the sidewall 92 of the vehicle 80. As depicted in FIG. 3 and shown in greater detail in FIG. 4, the rotatable drum 124 is mounted to the sidewall 92 with a hub 132 that interfaces with the governor 110. When the electronic control unit 200 determines the opening speed of the tailgate 90 needs to be reduced, the governor 110 interacts with the hub 132 to apply a governing force to the rotatable drum 124, which, in turn, limits the opening speed of the tailgate 90. In some embodiments, the retractable cable assembly 120 may further include a pre-wound spring 126 that applies a coiling force to the rotatable drum 124. The coiling force is applied in a direction that assists with winding the cable 122 about the rotatable drum 124 as the tailgate 90 rotates from an open position to a closed position.

Referring now to FIGS. 2 and 3, by controlling the opening speed of the tailgate 90, the tailgate energy management system 100 controls a maximum amount of kinetic energy that the tailgate 90 carries as the tailgate 90 rotates from a closed position to an open position. By limiting the amount of kinetic energy carried by the tailgate 90 as it opens, damage to the tailgate 90 and/or a surrounding object may be minimized if the tailgate 90 contacts the surrounding object while opening.

Specifically, as the tailgate 90 rotates to an open position, the tailgate assist damper 98 applies torque to the tailgate 90 that decreases the opening speed of the tailgate 90. Simultaneously, the cable 122 begins to pay out from the rotatable drum 124. The speed sensor 210 senses that the cable 122 is being paid out and transmits a speed signal to the electronic control unit 200 indicative of the opening speed of the tailgate 90. In the embodiment depicted in FIGS. 2 and 3, the speed sensor 210 measures the speed of rotation of the rotatable drum 124. Because the rotatable drum 124 pays out the cable 122 coupled to the tailgate 90, the speed of rotation of the rotatable drum 124 corresponds to the opening speed of the tailgate 90.

The electronic control unit 200 receives the speed signal from the speed sensor 210. A processor in the electronic control unit 200 processes the speed signal from the speed sensor 210, and, based on a computer readable and executable instruction set stored in memory, determines if the opening speed of the tailgate 90 is approaching a pre-determined maximum opening speed. The pre-determined maximum opening speed of the tailgate 90 may be calculated and stored in the memory of the electronic control unit 200. The maximum opening speed may be determined such that the kinetic energy of the tailgate 90 does not exceed a certain threshold of kinetic energy, for example about 10 joules. The opening speed of the tailgate 90 and the weight of the tailgate 90 determine the kinetic energy of the tailgate 90 as the tailgate 90 rotates to the open position.

The electronic control unit 200 compares the speed signal received from the speed sensor 210 to a stored value to determine whether the opening speed of the tailgate 90 is approaching or exceeds the pre-determined maximum opening speed. In some embodiments, the electronic control unit 200 may include a control variable that is stored in memory of the electronic control unit 200. The instruction set of the electronic control unit 200 instruct the processor to compare the speed signal that is received from the speed sensor 210 to the control variable stored in memory. In other embodiments, the electronic control unit 200 may include a lookup table stored in memory that correlates the speed signal transmitted by the speed sensor 210 to an opening speed of the tailgate 90. In yet other embodiments, the instruction set may include a conversion variable that correlates the speed signal transmitted by the speed sensor 210 to an opening speed of the tailgate 90. Thus, the electronic control unit 200 determines if the opening speed of the tailgate 90 is approaching a pre-determined maximum opening speed by comparing the speed signal transmitted by the speed sensor 210 to a stored value stored within the electronic control unit 200.

In the embodiment of vehicles 80 where the speed sensor 210 uses a Hall Effect sensor, the electronic control unit 200 may evaluate the time intervals between voltage peaks that are induced into the speed sensor 210 by rotating permanent magnets coupled to the retractable cable assembly 120. The time intervals between voltage peaks measured by the Hall Effect sensor correspond to the speed of rotation of the permanent magnets and, in turn, the opening speed of the tailgate 90. In addition, the electronic control unit 200 may evaluate the speed signal that is received from the speed sensor 210 to calculate the angular opening speed of the tailgate 90.

As the opening speed of the tailgate 90 approaches the maximum opening speed, the electronic control unit 200 processes the speed signal from the speed sensor 210 based on the instruction set and determines that the tailgate 90 is approaching the pre-determined maximum opening speed. The electronic control unit 200 transmits a control signal to the governor 110 to actuate the governor 110. The governor 110 receives the control signal from the electronic control unit 200 and, in turn, applies a governing force to the tailgate 90. The governing force slows the opening speed of the tailgate 90. In the embodiment depicted in FIGS. 2 and 3, the governor 110 is coupled to the rotatable drum 124 by the hub 132. The governor 110, therefore, applies the governing force to hub 132 such that the speed of rotation of the rotatable drum 124, and the corresponding speed that the rotatable drum 124 pays out the cable 122, is limited. Thus, the governor 110 slows the opening speed of the tailgate 90.

In embodiments of the vehicle 80 that include electromechanical brakes as the governor 110, the electronic control unit 200 may transmit a control signal to the governor 110 to intermittently apply and release the electromechanical brake, such that the governing force is "pulsed," thereby decreasing the opening speed of the tailgate 90.

In some embodiments, the tailgate assist damper 98 and the tailgate energy management system 100 may work in conjunction with one another to control the opening speed of the tailgate 90. In general, tailgate assist dampers 98 provide a directional force to tailgates 90 that decreases the opening speed of the tailgate 90 and reduces the force a user must apply to rotate the tailgate 90 from an open position to a closed position. Under normal operating conditions, the tailgate assist damper 98 may control the opening speed of the tailgate 90 without exceeding a predetermined maximum opening speed. However, under certain operating conditions, for example, with the vehicle 80 parked on an incline, at elevated temperatures, and/or with a worn tailgate assist damper 98, the tailgate 90 may be prone to open at speeds that exceed the pre-determined maximum opening speed. Under conditions such as these, the tailgate energy management system 100 and the tailgate assist damper 98 operate in conjunction with one another to control the opening speed of the tailgate 90 such that the tailgate 90 opens without intervention from a user, and opens without exceeding the pre-determined maximum opening speed.

Conversely, under certain operating conditions, for example, with the vehicle 80 parked on an incline, the tailgate 90 may be prone to open at a speed that does not exceed the maximum opening speed. Under such conditions, the tailgate assist damper 98 will apply torque to the tailgate 90 that prevents the tailgate 90 from opening at a speed greater than the maximum opening speed. In these conditions, the speed sensor 210 continues to transmit a speed signal to the electronic control unit 200. The electronic control unit 200 calculates that the opening speed of the tailgate 90 and determines that the opening speed of the tailgate 90 is not approaching the pre-determined maximum opening speed. Because no governing force is required to slow the opening speed of the tailgate 90 below the pre-determined maximum opening speed, the electronic control unit 200 does not transmit a control signal to the governor 110 to actuate the governor 110. Thus, the tailgate energy management system 100 does not apply a governing force to the tailgate 90 to reduce the opening speed of the tailgate 90.

Alternatively, or in addition to the tailgate assist damper 98, the vehicle 80 may include torsion springs (not shown) that apply a direction force to the tailgate 90. The directional force applied by the torsion springs is applied to the tailgate 90 is a direction that decreases the opening speed of the tailgate 90 and reduces the force a user must apply to rotate the tailgate 90 from an open position to a closed position.

Figure 5:
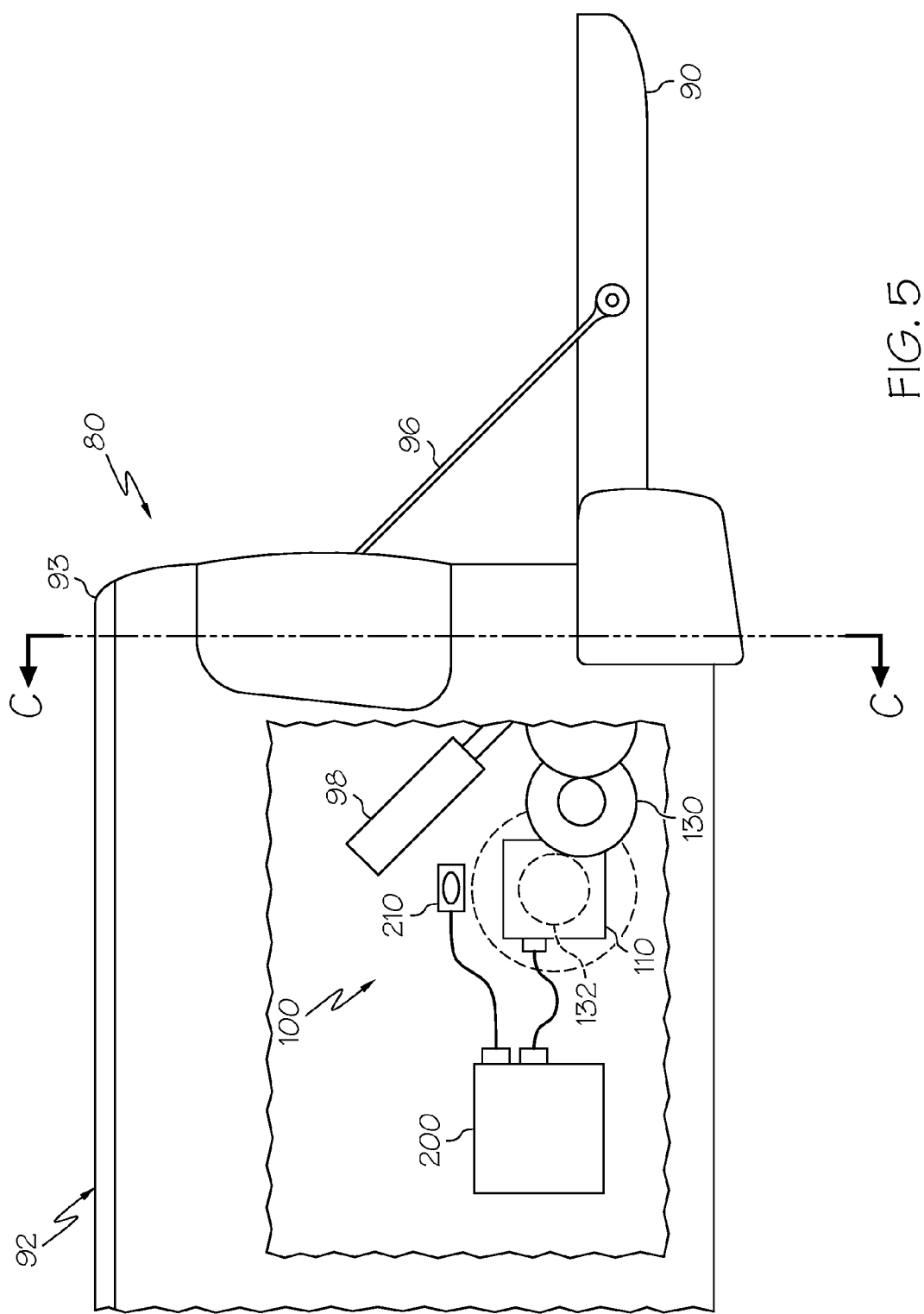
FIG. 5 depicts a cut-away side view of a vehicle including a tailgate energy management system according to one or more embodiments shown and described herein.
Figure 6:
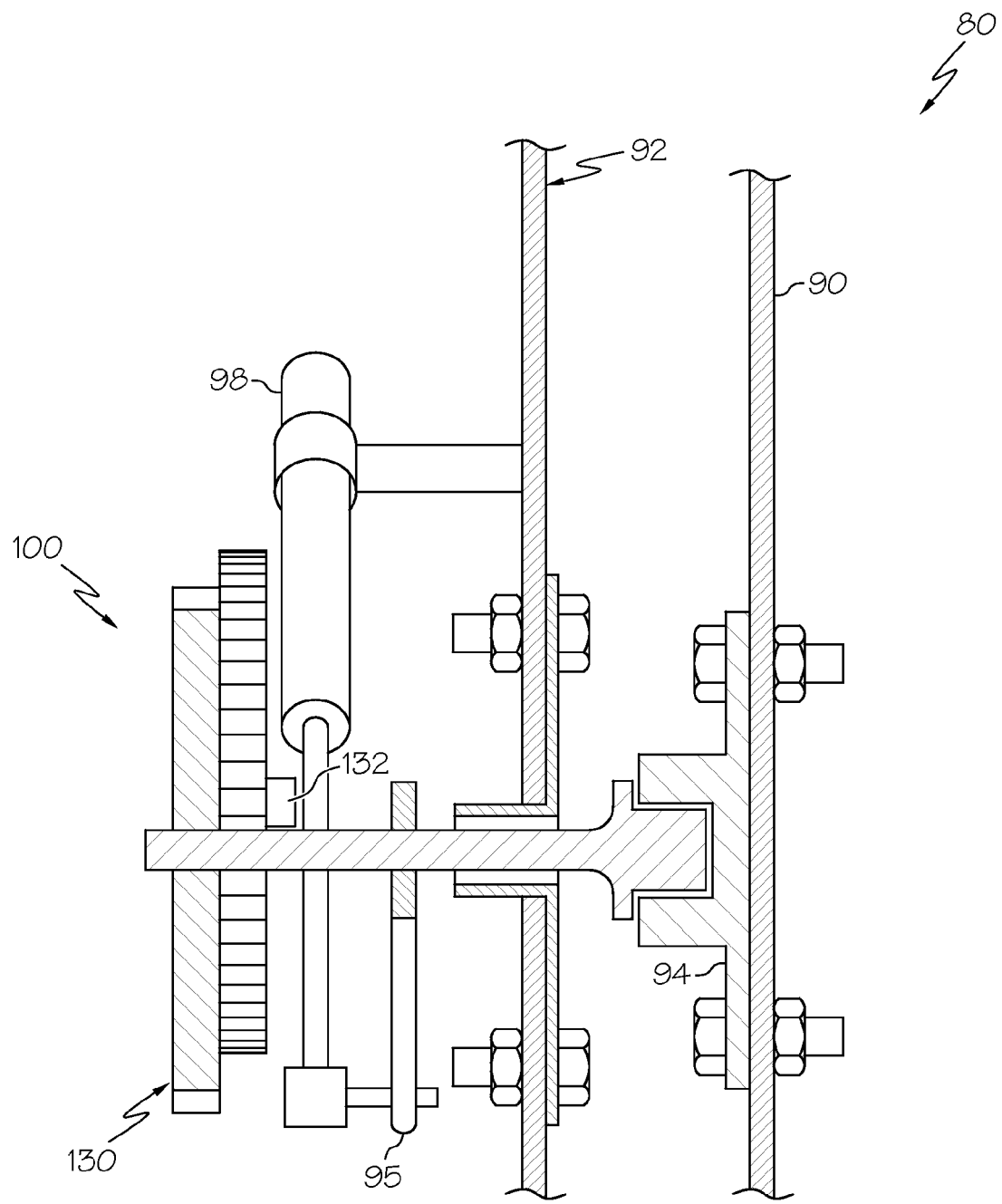
FIG. 6 depicts a rear view of the vehicle including a tailgate energy management system of FIG. 5 along line C-C.

Another embodiment of a vehicle 80 including a tailgate energy management system 100 is depicted in FIGS. 5 and 6. In this embodiment, the tailgate energy management system 100 includes a hub 132 located within one of the sidewalls 92 of the vehicle 80. In the depicted embodiment, the hub 132 is coupled to the tailgate 90 with a reduction gear set 130, a linkage 95, and a hinge 94. The hub 132 is coupled to the governor 110, allowing the governor 110 to apply the governing force to the tailgate 90 by applying the governing force directly to the hub 132.

Similar to the embodiment described with reference to FIGS. 2 and 3 above, the tailgate energy management system 100 depicted in FIGS. 5 and 6 controls a maximum amount of kinetic energy that may be carried by the tailgate 90 as the tailgate 90 rotates from a closed position to an open position. The speed sensor 210 transmits a speed signal indicative of the opening speed of the tailgate 90 to the electronic control unit 200. In the embodiment depicted in FIGS. 5 and 6, the speed sensor 210 measures the speed of rotation of one of the members of the reduction gear set 130. Because the reduction gear set 130 is coupled to the tailgate 90 by the linkage 95 and the hinge 94, the speed of rotation of the members of the reduction gear set 130 corresponds to the opening speed of the tailgate 90.

The electronic control unit 200 receives the speed signal from the speed sensor 210. The electronic control unit 200 evaluates the speed signal from the speed sensor 210 to determine if the opening speed of the tailgate 90 is approaching a pre-determined maximum opening speed. As the opening speed of the tailgate 90 approaches the maximum opening speed, the electronic control unit 200 transmits a control signal to the governor 110 to actuate. The governor 110 receives the control signal from the electronic control unit 200 and applies a governing force to the tailgate 90. The governing force slows the opening speed of the tailgate 90. In the embodiment depicted in FIGS. 5 and 6, the governor 110 applies the governing force to the hub 132, such that the speed of rotation of the hub 132, and the corresponding speeds of the reduction gear set 130, are limited. Thus, the governor 110 slows the opening speed of the tailgate 90.

Vehicles 80 that include tailgate energy management systems 100 as described herein may be included with other components that allow the tailgate 90 to be actuated by a user while the user is positioned at a location remote from the tailgate 90 and/or the vehicle 80. An example of such an application is a vehicle 80 that includes a remote keyless entry system that allows a user to trigger operation of tailgate 90. A vehicle 80 having a remote keyless entry system may allow the user to remotely rotate the tailgate 90 from a closed position to an open position. By limiting the maximum kinetic energy that the tailgate 90 may carry as it opens, the tailgate energy management system 100 may reduce the likelihood of damage due to contact of the tailgate 90 with any surrounding object as the tailgate 90 is remotely open.

Vehicles 80 that include remote keyless entry systems and tailgate energy management systems 100 as described hereinabove may include control logic that disables the remote keyless entry system in the event that the tailgate energy management system 100 is not reducing the opening speed of the tailgate 90. In one embodiment, the control logic may transmit a command to disable the remote keyless entry system from performing subsequent opening operations if the electronic control unit 200 determines that the opening speed of the tailgate 90 exceeds the maximum opening speed.

Additionally, as a user may remove and reattach the tailgate 90 from the vehicle 80, the user may reattach the tailgate 90 to the vehicle 80 without properly connecting the tailgate energy management system 100 to the tailgate 90. The electronic control unit 200 may include control logic stored in memory that evaluates the opening speed of the tailgate 90. If the tailgate energy management system 100 is not properly connected to the tailgate 90, the speed sensor 210 may not measure an opening speed of the tailgate 90 after the tailgate 90 has been triggered to open by the remote keyless entry system. In the event no opening speed is measured but an opening operation has been triggered by the remote keyless entry system, the electronic control unit 200 may disable the remote keyless entry system from triggering subsequent opening operations.

Alternatively, or in addition, in vehicles 80 that include the tailgate energy management system 100 as depicted in FIGS. 2 and 3, the electronic control unit 200 may be connected to a retraction sensor (not shown) that evaluates whether any cable 122 is paid out from the rotatable drum 124. In general, when connecting the cable 122 to the tailgate 90, cable 122 may be paid out from the rotatable drum 124. Thus, if the retraction sensor senses that no cable 122 is paid out (i.e., the cable 122 is fully wound along the rotatable drum 124), the electronic control unit 200 may disable the remote keyless entry system from triggering an opening operation.

Vehicles 80 may also include a tailgate position sensor (not shown) that senses if the tailgate 90 is located in a closed position and transmits a tailgate position signal to the electronic control unit 200. If the electronic control unit 200 determines that the tailgate 90 is located in an open position, the electronic control unit 200 may disable the remote keyless entry system from triggering an opening operation.

Vehicles 80 that include tailgate energy management systems 100 according to the present disclosure allow a user to manually rotate the tailgate 90 between open and closed positions without requiring operation of the tailgate energy management systems 100, such as when the kinetic energy of the tailgate 90 does not exceed the threshold energy as the user manually rotates the tailgate 90 between open and closed positions. Thus, a user may manually open the tailgate 90 of the vehicle 80 without having to disconnect the tailgate energy management system 100 from the tailgate 90. Additionally, the tailgate energy management system 100 may not add significant resistance to rotating the tailgate 90 to the closed position from the open position. Thus, closing the tailgate 90 by the user may not be more difficult as compared to a vehicle 80 that does not include a tailgate energy management system 100.

It should now be understood that vehicles having tailgates may include tailgate energy management systems that limit the opening speed of the tailgates. By limiting the opening speed of the tailgates, the amount of energy the tailgates carry as they open may be controlled such that the tailgates cannot impart significant force on surrounding objects. The tailgate energy management systems apply governing forces to the tailgates that control opening speed of the tailgates while allowing a user to manually open and close the tailgate of the vehicle. The tailgate energy management systems may work in conjunction with tailgate assist dampers, which assist both with opening and closing tailgates.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   sidewalls spaced laterally apart from one another;
   a tailgate located proximate to rear ends of the sidewalls;
   a governor coupled to one of the sidewalls and to the tailgate, the governor selectively applying a governing force to the tailgate only in a direction to reduce an opening speed of the tailgate;
   a speed sensor sensing the opening speed of the tailgate; and
   an electronic control unit electronically coupled to the governor and the speed sensor, the electronic control unit comprising a processor and memory storing a computer readable and executable instruction set,
   wherein the electronic control unit receives a speed signal indicative of the opening speed of the tailgate from the speed sensor and, when the opening speed of the tailgate approaches a pre-determined maximum opening speed, the processor executes the instruction set to cause the electronic control unit to transmit a control signal to the governor such that the governor applies the governing force to slow the opening speed of the tailgate.

2. The vehicle of claim 1 further comprising a retractable cable assembly comprising:
   a cable coupled to the tailgate; and
   a rotatable drum about which the cable is wound coupled to the governor,
   wherein the governor applies the governing force to the tailgate through the rotatable drum.

3. The vehicle of claim 2, wherein the retractable cable assembly further comprises a pre-wound spring, the pre-wound spring applying a force to the rotatable drum in a direction corresponding to the tailgate rotating from an open position to a closed position.

4. The vehicle of claim 1 further comprising a hub located within one of the sidewalls coupled to the tailgate and to the governor, wherein the governor applies the governing force to the tailgate through the hub.

5. The vehicle of claim 4, wherein the hub is coupled to a reduction gear set and the reduction gear set is coupled to the tailgate.

6. The vehicle of claim 4, wherein the hub is coupled to a hinge about which the tailgate rotates between an open position and a closed position.

7. The vehicle of claim 1 further comprising a tailgate assist damper coupled to one of the sidewalls and the tailgate, wherein the tailgate assist damper applies an assist force to the tailgate in a direction corresponding to rotating the tailgate from an open position to a closed position, the assist force being applied to the tailgate simultaneously and in addition to the governing force applied by the governor.

8. The vehicle of claim 1 further comprising an over-travel cable coupled to one of the sidewalls and the tailgate, wherein the over-travel cable supports the tailgate in an open position.

9. A tailgate energy management system for controlling an opening speed of a tailgate relative to sidewalls of a vehicle, the tailgate energy management system comprising:
- a governor coupled to one of the sidewalls and to the tailgate, the governor selectively applying a governing force to the tailgate only in a direction to reduce the opening speed of the tailgate;
- a speed sensor sensing the opening speed of the tailgate; and
- an electronic control unit electronically coupled to the governor and the speed sensor, the electronic control unit comprising a processor and memory storing a computer readable and executable instruction set, wherein the electronic control unit receives a speed signal indicative of the opening speed of the tailgate from the speed sensor and, when the opening speed of the tailgate approaches a pre-determined maximum opening speed, the processor executes the instruction set to cause the electronic control unit to transmit a control signal to the governor such that the governor applies the governing force to slow the opening speed of the tailgate.

10. The tailgate energy management system of claim 9 further comprising a retractable cable assembly comprising a cable coupled to the tailgate and a rotatable drum about which the cable is wound and coupled to the governor, wherein the governor applies the governing force to the tailgate through the rotatable drum.

11. The tailgate energy management system of claim 9 further comprising a hub located within one of the sidewalls, coupled to the tailgate and to the governor, wherein the governor applies the governing force to the tailgate through the hub.

12. The tailgate energy management system of claim 11 further comprising
- a hinge coupled to one of the sidewalls about which the tailgate rotates between an open position and a closed position; and
- a reduction gear set coupled to the hinge and to the hub.

13. The tailgate energy management system of claim 9 further comprising a tailgate assist damper coupled to one of the sidewalls and the tailgate, wherein the tailgate assist damper applies an assist force to the tailgate in a direction corresponding to rotating the tailgate from an open position to a closed position, the assist force being applied to the tailgate simultaneously and in addition to the governing force applied by the governor.

14. The tailgate energy management system of claim 9 further comprising an over-travel cable coupled to one of the sidewalls and to the tailgate, wherein the over-travel cable supports the tailgate in an open position.

\* \* \* \* \*